United States Patent Office 2,819,309
Patented Jan. 7, 1958

2,819,309
PRODUCTION OF VITAMIN A AMINE

Howard C. Klein, Brooklyn, N. Y., assignor to Nopco Chemical Company, Harrison, N. J., a corporation of New Jersey No Drawing. Application November 4, 1955
Serial No. 545,124

6 Claims. (Cl. 260—563)

This invention relates to vitamin A amine and to a method for producing vitamin A amine.

In U. S. patent application Serial No. 545,125 of Schaaf, Klein and Kapp, filed concurrently herewith, there is disclosed a procedure for producing a compound having vitamin A activity, which compound is highly useful as an intermediate in the production of vitamin A. This compound is referred to in the Schaaf, Klein and Kapp application as "Compound IV" and will be referred to herein as Compound IV.

Compound IV when tested biologically on rats shows a vitamin A activity of about 50%. Its ultra-violet spectrographic characteristics are practically identical with those of vitamin A; however, infra-red spectrographic analysis shows that Compound IV does not contain a hydroxyl group. Analysis of Compound IV discloses the presence of an N-H stretching band in the infra-red spectrographic curve of Compound IV indicating the presence in Compound IV of either a primary or a secondary amino group. Analysis of Compound IV by the Kjeldahl method shows that Compound IV has a nitrogen content of about twice the nitrogen content of the vitamin A amine (referred to hereafter as "vitamin A amine") wherein an amine group has replaced the hydroxyl group of vitamin A. The physical and chemical characteristics of Compound IV indicate that it contains the vitamin A chromophoric system wherein the hydroxyl group of vitamin A has been replaced by a basic fragment similar to a major portion of the hexamethylene tetramine molecule. It is a viscous liquid soluble in ethyl ether, ethyl alcohol, acetone and similar solvents. It has an absorption maximum in the ultra-violet at 3250 A. and has at that wave length an extinction coefficient of about 1000. If it is treated with hydrobromic acid, a product is obtained which has an absorption maximum at 3300 A. Likewise treatment of Compound IV with phosphoric acid gives a product having an absorption maximum at 3280–3300 A. Presumably salts of Compound IV are formed by the treatments with hydrobromic acid and phosphoric acid since treatment of the products with alkali gives in each case the original Compound IV. Acetylation of Compound IV with acetic anhydride gives a product which when analyzed by infra-red analysis shows the presence of an amide band in the infra-red spectrographic curve.

It is disclosed in the Schaaf, Klein and Kapp application referred to hereinabove that Compound IV can be prepared from a material having the empirical formula $C_{20}H_{30}O$, which compound contains the β-ionone ring structure, four ethylenic bonds and one hydroxyl group and which in the trans configuration has an absorption maximum in the ultra-violet at 2710 A., a molecular extinction coefficient at that wave length of 29,100 and has a refractive index at 20° C. of about 1.552, and which in the cis configuration has an absorption maximum in the ultra-violet at 2740 A., a molecular extinction coefficient at 25,900 and has a refractive index at 16° C. of about 1.535. This compound, both the cis and the trans form of it, is referred to in the Schaaf, Klein and Kapp application as "Compound I" and will be so referred to herein.

It is believed that Compound I has the following structural formula:

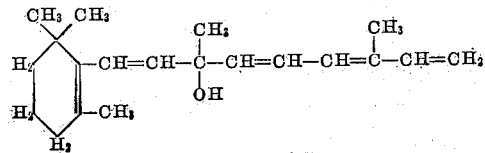

Compound I

In the Schaaf, Klein and Kapp application it is disclosed that Compound IV may be prepared by treating either the cis or the trans form of Compound I with boron trifluoride hexamethylene tetramine complex under appropriate reaction conditions in a water-containing aromatic hydrocarbon solvent solution. This procedure gives yields of Compound IV in the neighborhood of 30%. When this procedure is carried out at room temperature a reaction time in the neighborhood of approximately 40 hours is usually employed.

In U. S. patent application Serial No. 545,123 of Klein, Beckmann and Schaaf, filed concurrently herewith, there is disclosed a procedure for producing Compound IV which is an improvement over the procedure disclosed in the Schaaf, Klein and Kapp application referred to above. In the Klein, Beckmann and Schaaf procedure Compound IV is produced by reacting Compound I with boron trifluoride hexamethylene tetramine complex under appropriate reaction conditions in a solvent selected from the group consisting of acetone, acetonitrile, acrylonitrile, benzyl cyanide, dioxane, isopropenyl acetate and tetrahydrofuran. The preferred solvent is dioxane containing a small amount of water.

It is the object of this invention to provide a procedure for producing vitamin A amine from Compound IV.

Other objects of this invention will in part be obvious and will in part appear hereinafter.

The above and other objects of the invention are accomplished by treating Compound IV with aluminum isopropoxide in an anhydrous solvent solution. This treatment converts Compound IV to vitamin A amine in very excellent yield.

The treatment of Compound IV with aluminum isopropoxide can be carried out in any one of a number of different solvents. Any solvent which does not react with, i. e. is inert to, aluminum isopropoxide and Compound IV and will form a substantially homogeneous solution with them can be used. Thus the aromatic hydrocarbon solvents employed in the procedure of the Schaaf, Klein and Kapp application, i. e. benzene, toluene, xylene, methyl isopropyl benzene, isopropyl benzene, ethyl benzene, diethyl benzene, mesitylene, butyl benzene, amyl benzene, etc. and similar aromatic hydrocarbon solvents can all be used as the solvent for the treatment of Compound IV with aluminum isopropoxide. Likewise the various organic solvents employed in the procedure of Klein, Beckmann and Schaaf referred to hereinabove can be employed as the solvent in which to carry out the treatment of Compound IV with aluminum isopropoxide. Mixtures of the above solvents can be employed if desired. In all cases the solvents which are employed should be anhydrous since water will convert aluminum isopropoxide to aluminum hydroxide and isopropyl alcohol. The preferred solvent is an anhydrous mixture of acetone and benzene.

In treating Compound IV with aluminum isopropoxide to convert Compound IV to vitamin A amine, from one to five parts by weight of aluminum isopropoxide based on the weight of the Compound IV being treated can be employed. The preferred ratio is from about two to three parts of aluminum isopropoxide by weight for each part by weight of Compound IV.

After the aluminum isopropoxide has been added to the solvent solution of the Compound IV, the reaction mixture is then heated, preferably at the reflux temperature of the solvent solution. Heating of the reaction mixture for a period of from ten to sixteen hours will convert the Compound IV to vitamin A amine in very high yield. However, shorter periods of heating may be employed if desired since such shorter periods convert by far the major portion of the Compound IV to vitamin A amine.

On completion of the reaction, the vitamin A amine may readily be recovered from the reaction mixture by various means. It is preferred to add an excess of an aqueous solution of either sodium hydroxide or potassium hydroxide to the reaction mixture to convert the aluminum isopropoxide to isopropyl alcohol and either sodium aluminate or potassium aluminate. Both the sodium and the potassium aluminate will be soluble in the aqueous phase of the reaction mixture. The vitamin A amine is then readily recovered from the reaction mixture by extraction with a water-immiscible solvent in which vitamin A amine is soluble. Ethyl ether is highly satisfactory for this purpose. The vitamin A amine is then readily recovered from the solvent extracts by evaporation of the solvent. Any other suitable means for isolating the vitamin A amine from the reaction mixture can be employed. A very excellent yield of vitamin A amine is obtained.

For a fuller understanding of the nature and objects of the invention, reference may be had to the following example which is given merely for purposes of illustration and is not to be construed in a limiting sense:

Example 189.2 mg. of Compound IV were dissolved in 6 ml. of anhydrous purified acetone and 10 ml. of anhydrous benzene. Then 1.0 gm. of a 50% by weight solution of distilled aluminum isopropoxide in toluene was added to the solvent solution of Compound IV and the resulting mixture was refluxed for 16 hours. On completion of the refluxing, an excess of a 10% aqueous solution of potassium hydroxide was added to the reaction mixture to convert the aluminum isopropoxide to potassium aluminate and isopropyl alcohol. The reaction mixture was then extracted several times with ethyl ether. The ether extracts were combined and the solvent removed therefrom by distillation under vacuum to give a residue which on analysis was found to be vitamin A amine. The product was found to have a nitrogen content of 4.89% as compared to the theoretical nitrogen content for vitamin A amine of 4.92%. Ultra-violet spectroscopic analysis of the product showed a maximum at 3250 A. which is the figure reported for vitamin A amine by Weisler in U. S. Patent No. 2,583,194. A quantitative yield of crude vitamin A amine based on the weight of the Compound IV employed was obtained.

Having described my invention, what I claim as new and desire to secure by Letters Patent is:

1. A process for producing vitamin A amine which comprises heating in the presence of an inert solvent from one to five parts by weight of aluminum isopropoxide with one part by weight of an organic compound having the following characteristics: (1) an absorption maximum in the ultra-violet at 3250 A. with an extinction coefficient at that wave length of about 1000, (2) when treated with hydrobromic acid gives a product having an absorption maximum in the ultra-violet at 3300 A., (3) when treated with phosphoric acid gives a product having an absorption maximum in the ultra-violet of 3280–3300 A., (4) has a Kjeldahl nitrogen content of 9.6%, (5) when treated with acetic anhydride gives a product, the infra-red spectrographic curve of which contains an amide band, (6) when treated with iodine is converted to vitamin A aldehyde, (7) has the vitamin A chromophoric system, (8) has a basic fragment similar to a major portion of the hexamethylene tetramine molecule, and (9) has a vitamin A activity of approximately 50% when tested biologically.

2. A process for producing vitamin A amine which comprises refluxing for about ten to sixteen hours in the presence of an anhydrous inert organic solvent from two to three parts by weight of aluminum isopropoxide with one part by weight of an organic compound having the following characteristics: (1) an absorption maximum in the ultra-violet at 3250 A. with an extinction coefficient at that wave length of about 1000, (2) when treated with hydrobromic acid gives a product having an absorption maximum in the ultra-violet at 3300 A., (3) when treated with phosphoric acid gives a product having an absorption maximum in the ultra-violet of 3280–3300 A., (4) has a Kjeldahl nitrogen content of 9.6%, (5) when treated with acetic anhydride gives a product, the infra-red spectrographic curve of which contains an amide band, (6) when treated with iodine is converted to vitamin A aldehyde, (7) has the vitamin A chromophoric system, (8) has a basic fragment similar to a major portion of the hexamethylene tetramine molecule, and (9) has a vitamin A activity of approximately 50% when tested biologically.

3. The process of claim 1 wherein the organic solvent is selected from the group consisting of aromatic hydrocarbon solvents, acetone, acetonitrile, acrylonitrile, benzyl cyanide, dioxane, isopropenyl acetate and tetrahydrofuran.

4. The process of claim 3 wherein from two to three parts by weight of aluminum isopropoxide for each part by weight of the organic compound is employed.

5. The process of claim 4 wherein the organic solvent is an aromatic hydrocarbon solvent.

6. The process of claim 3 wherein the solvent solution of the aluminum isopropoxide and the organic compound is heated at about reflux temperature for a period of at least about ten hours.

References Cited in the file of this patent

UNITED STATES PATENTS 2,415,834     Milas                    Feb. 18, 1947